United States Patent
Ji et al.

(10) Patent No.: US 8,873,952 B2
(45) Date of Patent: Oct. 28, 2014

(54) VARIABLE RATE OPTICAL TRANSMITTER BASED ON ALL-OPTICAL OFDM SUPER-CHANNEL TECHNOLOGY

(75) Inventors: Philip Nan Ji, Plainsboro, NJ (US); Yue-Kai Huang, Princeton, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 144 days.

(21) Appl. No.: 13/588,425

(22) Filed: Aug. 17, 2012

(65) Prior Publication Data
US 2013/0058648 A1    Mar. 7, 2013

Related U.S. Application Data

(60) Provisional application No. 61/530,069, filed on Sep. 1, 2011.

(51) Int. Cl.
| | | |
|---|---|---|
| H04B 17/00 | (2006.01) | |
| H04J 14/04 | (2006.01) | |
| H04J 4/00 | (2006.01) | |
| H04J 14/02 | (2006.01) | |
| H04B 10/04 | (2006.01) | |
| H04B 10/548 | (2013.01) | |
| H04L 27/20 | (2006.01) | |
| H04L 27/26 | (2006.01) | |

(52) U.S. Cl.
CPC .......... *H04B 10/548* (2013.01); *H04L 27/2697* (2013.01); *H04L 27/2096* (2013.01); *H04J 14/0298* (2013.01); *H04J 14/0221* (2013.01)
USPC ............ 398/38; 398/45; 398/79; 398/76; 398/188; 398/187

(58) Field of Classification Search
CPC ............. H04B 10/548; H04J 14/0221; H04J 14/0298; H04L 27/2697
USPC ............. 398/79, 120, 76, 188/187/186/197; 370/210
See application file for complete search history.

(56) References Cited

U.S. PATENT DOCUMENTS

| | | | |
|---|---|---|---|
| 7,170,849 B1* | 1/2007 | Arivoli et al. | 370/208 |
| 2005/0271387 A1* | 12/2005 | Kee et al. | 398/140 |
| 2007/0140704 A1* | 6/2007 | Mauro et al. | 398/188 |
| 2011/0002693 A1* | 1/2011 | Mizuochi et al. | 398/140 |

* cited by examiner

*Primary Examiner* — David Payne
*Assistant Examiner* — Omar S Ismail
(74) *Attorney, Agent, or Firm* — Joseph Kolodka

(57) ABSTRACT

The present invention is directed to a method including determining an appropriate power level for a phase modulator for an optimum number of subcarriers; and applying the determined appropriate power level via a controller to produce the optimum number of subcarriers, wherein the optimum number of subcarriers enables an optical-orthogonal frequency division multiplex O-OFDM based variable rate transmitter with automatic control by a controller to produce an optimum setting based on a required rate.

13 Claims, 5 Drawing Sheets

VARIABLE RATE OPTICAL TRANSMITTER BASED ON ALL-OPTICAL OFDM SUPER-CHANNEL TECHNOLOGY

RELATED APPLICATION INFORMATION

This application claims priority to provisional application No. 61/530,068 filed Sep. 16, 2011, the contents thereof are incorporated herein by reference

BACKGROUND OF THE INVENTION

The present invention relates generally to optical communications, and more particularly, to a variable rate transmitter based on all-optical orthogonal frequency division multiplexing OFDM super channel technology.

Optical WDM network is the backbone for the global communication networks. As the network traffic demand increases and the services become more heterogeneous, the optical WDM network is facing demands for greater capacity and better flexibility.

To solve the capacity demand, advanced modulation formats (such as QPSK, 8-QAM, 16-QAM, and OFDM) and multiplexing techniques (such as polarization division multiplexing) have been proposed and demonstrated. These technologies lead to better spectral efficiency and higher data rate per optical channel. For example, the data rate (or called "line rate") for a single optical channel (here "one optical channel" refers to the optical signal that is generated from a single optical source, most commonly a laser) in the WDM network has been increased from 10 Gb/s to 40 Gb/s to 100 Gb/s or higher in commercial products. 400 Gb/s and 1 Tb/s (i.e. 1000 Gb/s) optical channels have also been demonstrated. The high capacity optical channel generation techniques can be divided into 3 categories: The first type uses single carrier electrical time domain multiplexing (ETDM), where the time-multiplexed electrical data are modulated onto the single optical carrier, this is the dominating technique used for optical channels up to 100 Gb/s. The second type uses optical time domain multiplexing (OTDM), which applies time division multiplexing on both the electrical and optical domain, here the optical carrier remains single. The third type is multi-carrier modulation. It is also referred to as optical orthogonal frequency division multiplexing (O-OFDM) or super-channel. Here multiple subcarriers (or called "optical tones") are firstly generated from the single optical source, each subcarrier is then modulated with different data. Since these subcarriers/tones are orthogonal to one another, they can be placed closely spectrally without causing crosstalk, therefore they can produce high spectral efficiency. Among the three, the super-channel method is considered as the most suitable solution for high capacity channel beyond 100 Gb/s because it does not suffers from the bandwidth limitation of electronic and opto-electronic devices compared to the other 2 methods.

To improve the network flexibility, the WDM network is evolving from the conventional "single line rate with fixed channel spacing" to "mixed line rate with fixed channel spacing" and eventually to "mixed line rate with flexible spacing". The latter one is also called "flexible optical WDM (FWDM) network" or "flexible grid WDM network" or "grid-less WDM network". In such network, optical channels have different line rates, and the spectral spacing between neighboring channels is non-uniform to provide the best spectrum utilization. The line rate of each channel and the channel spacing can also vary over time. And optical channels can be added or dropped dynamically at any node in the network. A key element in such FWDM network is variable rate transponder, which converts client data with variable rate to optical WDM signal and transmit it, and receive the WDM channel with variable data rate and converts it back to client data. Inside the variable rate transponder, a key element is the variable rate transmitter, which modulates the variable rate data to an optical signal.

For the first type of optical signal (ETDM), the methods to achieve such variable rate transmitter include: (I.1) varying the modulation format (such as use switches to turn on/off modulation stages, so that the modulation format can be changed between QPSK and 8PSK, or between 8-QAM and 16-QAM), or (I.2) changing the rate of the ETDM modulation data, or mixture of (I.1) and (I.2). There are some tradeoffs for these two techniques. For technique (I.1), varying the modulation format will lead to different OSNR penalty and transmission impairment in the optical signal, therefore the transmission reach will be affected. For technique (I.2), the opto-electronic component can only operate within certain data rate range, and its performance will vary with the data rate. The transmission reach is also varied with the modulated data rate.

To construct a variable rate transmitter on the second type of optical signal (OTDM), each symbol period is divided into different number of tributaries. This method has even more restriction in the achievable data rate range because of the difficulties to adjust the timing properly. Also, the number of tributaries in each symbol period needs to be integer, therefore the selection is fewer.

For the third type of optical signal (O-OFDM or super-channel), varying the channel rate can be done by: (III.1) varying the number of subcarriers generated from the single optical source; or (III.2) changing the modulation data rate in each subcarrier, which is achieved electronically by changing the modulation format or changing the subcarrier data rate or both; or the combination of (III.1) and (III.2). Using technique (III.2) here has the same tradeoff as in the first type of signal (ETDM). However technique (III.1) does not suffer from significant transmission range variation, since the data format and rate in each subcarrier remains the same.

Achieving variable rate transmitter in O-OFDM system by varying the subcarrier number has been proposed and demonstrated by several research groups. So far, all these implementations are: construct the maximum number of subcarriers required, then use some filtering device (such as optical filter or wavelength-selective switch(WSS)) to select the subcarriers that are needed. The remained subcarriers are then modulated with the electrical signal (carrying data) to be transmitted.

Such a method is straightforward, but it is not energy efficient. The optical power applied to unused subcarriers is wasted after these subcarriers are filtered out. Therefore less power are applied to the useful subcarriers. Less signal power leads to worse OSNR (optical signal to noise ratio) at the transmitter side. As a result, the transmission reach (distance) of the signal becomes shorter.

Accordingly, there is a need for a variable rate transmitter based on all-optical orthogonal frequency division multiplexing OFDM super channel technology.

BRIEF SUMMARY OF THE INVENTION

The present invention is directed to a method including determining an appropriate power level for a phase modulator for an optimum number of subcarriers; and applying the determined appropriate power level via a controller to produce the optimum number of subcarriers, wherein the optimum number of subcarriers enables an optical-orthogonal frequency division multiplex O-OFDM based variable rate transmitter with automatic control by a controller to produce an optimum setting based on a required rate.

These and other advantages of the invention will be apparent to those of ordinary skill in the art by reference to the following detailed description and the accompanying drawings.

DETAILED DESCRIPTION

The present invention is directed to constructing a variable rate transmitter on this type of optical signal (O-OFDM) done varying the number of subcarriers generated from the single optical source. The inventive method can control the number of generated subcarriers efficiently and improve the quality of the generated signal. Moreover, the present invention adds intelligent control to the subcarrier generation stage in the variable rate transmitter. It calculates and applies the optimum control setting to generate only the necessary amount of subcarriers, so that no optical power is wasted in generating additional unwanted subcarriers. It also provides mechanism to ensure good power uniformity among the subcarriers. The invention focuses on constructing the variable rate transmitter on this type of optical signal (O-OFDM) using technique (III.1) (varying the subcarrier number). Our method can control the number of generated subcarriers efficiently and improve the quality of the generated signal.

Figure 1:
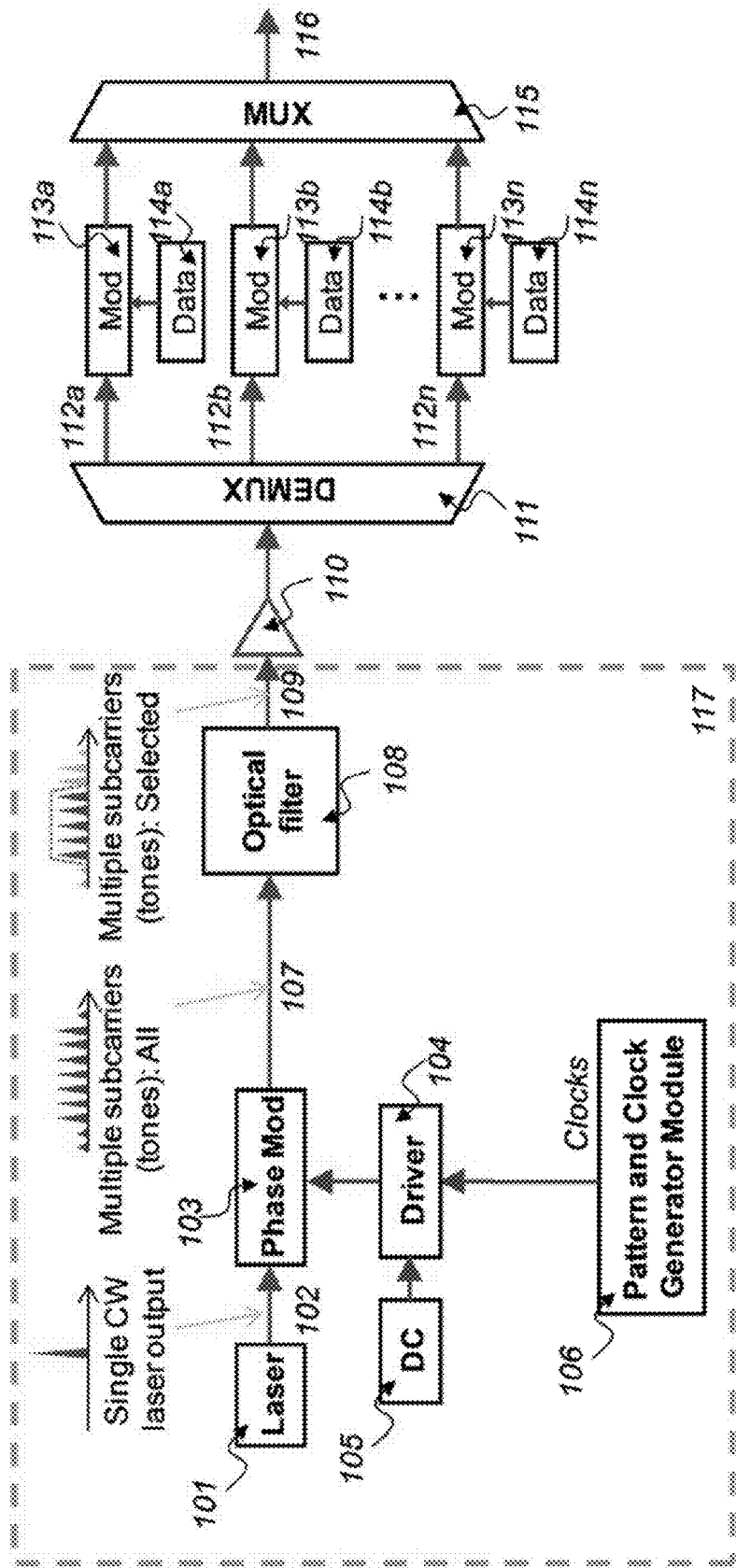
FIG. 1 shows a conventional method to construct a variable rate transmitter using subcarrier adjustment on O-OFDM system.

In the transmitter of FIG. 1, a laser (101) generates a continuous wave (CW) laser output (102), which only has a single tone (spectral peak). This laser signal is sent through a phase modulator (103). This modulator is driven by an electrical driver (104). This driver takes the electrical power from a DC power supply (105) and amplifies the periodic signal generated by a pattern and clock generator module (106) at a certain fixed frequency. The amplified electrical signal is modulated onto the CW laser optical signal (102) through the phase modulator (103). The result is an optical signal with multiple phase-locked tones (107). These tones are the O-OFDM subcarriers. At this step, the maximum number of subcarriers are generated. The number of subcarriers and the spacing between two neighboring subcarriers are set by the modulated signal from the driver (104), which is determined by the amplitude and the frequency at from the generator (106). The relationship can be expressed using the wide-band frequency modulation theory where the phase of an optical carrier $\omega_c$ is modulated by a sinusoidal signal at $\omega_{sc}$ with modulation index $\beta$. The resulting output optical field can be expanded into a summation of different subcarrier tones with coefficients representing Bessel functions of the first kind, as shown here:

$$E(t) = E_c \exp(j\omega_c t + j\beta\sin(\omega_{sc}t))$$
$$= E_c \sum_{n=-\infty}^{\infty} J_n(\beta)\exp[j(\omega + n\omega_{sc})t]$$

As indicated in the equation above, the key factor that governs the number of subcarriers generated are the coefficients $J_n(\beta)$. These $n^{th}$ order Bessel functions of the first kind are oscillatory functions of the drive signal amplitude, of the phase modulator. Besides the useful subcarriers, there are usually some undesirable side tones generated (see spectrum for point 107), they are filtered out by an optical filtering device (108) such as optical filter or WSS.

After the multi-subcarrier generation stage (117), the multi-subcarrier signal is then amplified using an optical amplifier (110). These subcarriers are separated optically through devices such as an optical WDM demultiplexer (111) into n individual subcarriers (112a-112n), where n is the total number of subcarriers. Each subcarrier is the modulated with the respective data (114a-114n) through individual modulators (113a-113n). These modulated optical subcarriers are then combined using an optical multiplexer (115). The output signal (116) is the modulated super-channel (O-OFDM) signal to be transmitted.

This method of generating super-channel was proposed by our lab in a prior invention [Yu], and has been demonstrated to generate super-channels with various high capacities such as 400 Gb/s, 1 Tb/s [Xia1, Xia2]. In these experiments, the number of subcarriers and the subcarrier spacing are predetermined based on the target super-channel data rates, therefore the optimum settings for the driver signal are precalculated based on the theory above and applied to the experiment setup.

If the data rate needs to be changed, the optical filter (108) needs to be changed to select only those subcarriers (109) that are needed based on the new target data rate (such as those within the red dotted regions). Conventional optical filers have fixed passband width and center frequency, therefore each data rate will require a specific filter. Tunable optical filters allow the tuning of center frequency, however most of the commercial tunable optical filters have fixed passband width, therefore they are also not convenient for variable rate transmitter application. WSS's with finer spectral granularities are more suitable for such application. However they need to be manually configured.

In terms of the driving setting for the phase modulator (103), if it is not changed, the same amount (maximum) of subcarriers will be generated at 107. Part of them will be filtered out and the power is wasted. Alternatively, the driver condition can be changed, but this require manual configuration and is both time consuming and requiring higher operation cost.

Figure 2:
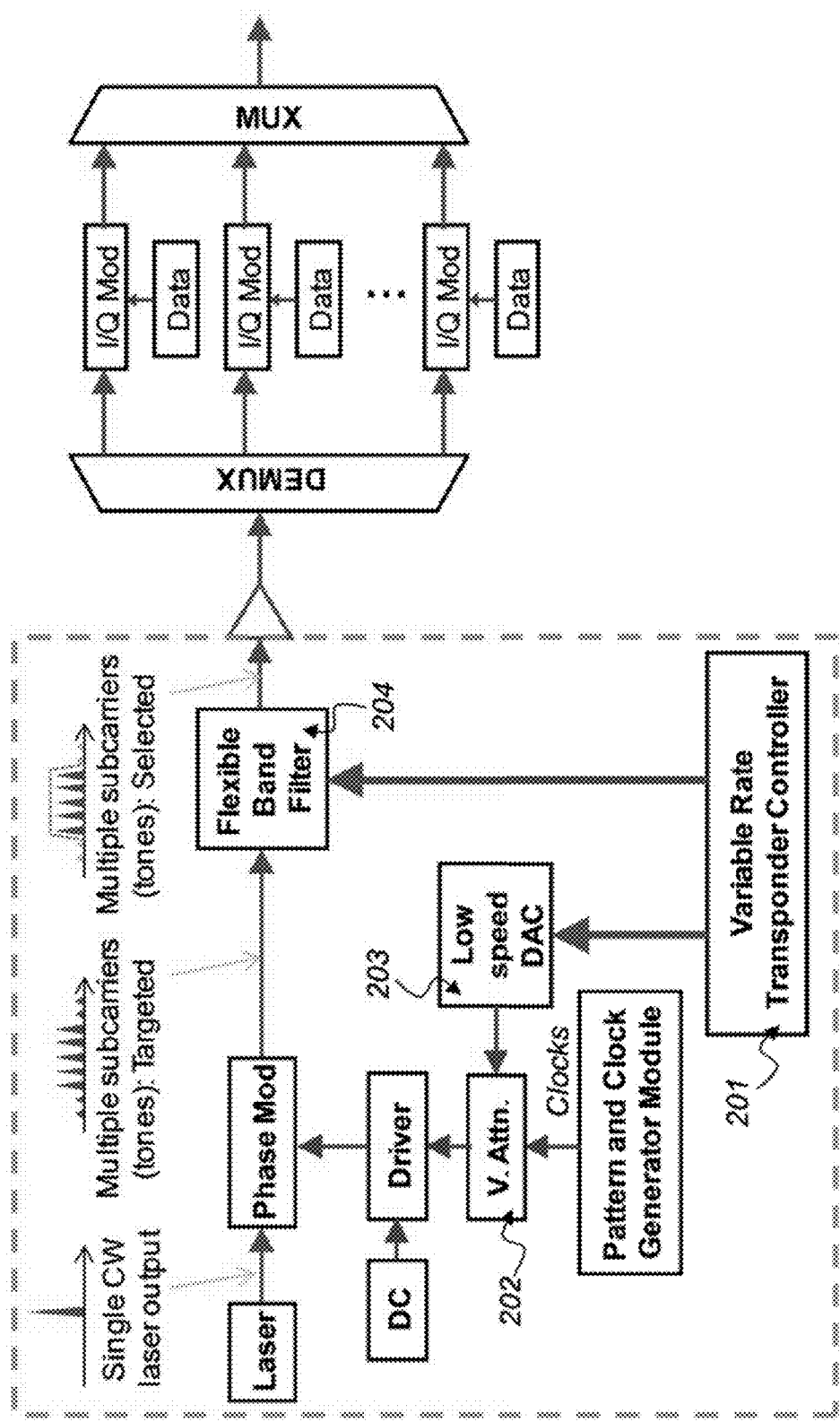
FIG. 2 shows a method to construct a variable rate transmitter using subcarrier adjustment on O-OFDM system, in accordance with the invention.

Referring to the diagram of FIG. 2 showing the inventive transmitter, the main changes are at the multi-subcarrier generation stage (117).

Here a variable rate transponder controller (201) is added to the multi-subcarrier generation stage (117). Its input information is the target number of subcarriers (which is time varying). It then computes the appropriate driving voltage to generate this target amount of subcarriers based on the theoretical model described earlier on the Bessel function coefficients. We know that $\lim_{\beta \to 0} J_n(\beta)=0$ when $n \neq 0$. And for a given n ($n \neq 0$), $J_n(\beta)$ is a monotonous increasing function before it reaches a maximum. For a larger n value, the corresponding $\beta$ for reaching this maximum is also larger. By using these characteristics, one can alternatively generate a look-up table for each target subcarrier setting. The controller can then maintain the look-up table with previous obtained settings. When the required subcarrier number changes, it can output the appropriate driving voltage by checking the look-up table and reduce the computation time. The appropriate attenuation level is then determined based on this modulation power level and the physical characteristics of the system (such as the output level of the pattern and clock generator module, the response of the modulation driver, the response of the variable attenuator). This attenuation level is usually produced in a digital format at the output of the controller (201). It is then converted into the analog format for an electrical variable attenuator (202) through a digital-to-analog converter (203). By adjusting the appropriate attenuation level, the amplitude of the signal into the driver (104) (and in turn the amplitude of the signal that drives the phase modulator 103) is set to produce the right amount of subcarriers. The computation is not complicate, therefore the hardware cost for the controller is low. Since the operation of changing the super-channel data rate does not occur frequently in practical optical networks (expected to be in the order of days or months), no high speed DAC is required. Therefore the cost of the DAC is also low. Having the DAC-controlled variable attenuator also helps to stabilize the driving voltage into the modulator and thus preventing system fluctuation. Some variable attenuators (usually the instrument type) have the capability of accepting digital input, therefore the low speed ADC (203) and the variable attenuator (202) can be integrated and controlled directly by the controller (201).

Another change in the proposed configuration is that the optical filter (108) is replaced with a flexible band filter (204), such as a passband variable WSS or a passband variable wavelength blocker (WB) or a flexible band tunable filter (FBTF). These devices allows flexible control of the center frequency and the passband width through electrical signal. One major benefits of using a passband variable WSS or WB in super-channel generation is that the flexible attenuation value provided by the WSS or WB can be used to equalize the strength of each generated tones, thus ensuring the same OSNR for each transmitted subcarriers. The controller (201) also generates signals to configure these settings for the filter (204), and thus eliminates the requirement for manual operation. Since in most upcoming WDM transmitters, the wavelength of the source laser is tunable, having the flexible band filter can easily accommodate such wavelength tuning (unlike traditional fixed optical filter).

The other parts of the transmitter (such as the subcarrier de-multiplexing, data modulation, subcarrier multiplexing) are the same as the existing design shown on FIG. 1. Therefore upgrading to such variable rate system does not require a lot of hardware modification or disruption.

In an alternative embodiment of the invention, an additional modulator stage can be added to double the number of subcarriers. The inventive control mechanism also shows the benefit in such system. The alternative inventive transmitter is shown on FIG. 3.

Here a Mach-Zehnder modulator (301, MZM) is placed after the phase modulator (103), In this configuration, the phase modulating frequency is double the clock rate while the MZM is driven at the clock rate produced by the pattern and clock generator module (106). The drive signals to the phase modulator and MZM are synchronized and phase matched so that the MZM will generate one additional tone for every tone the phase modulator generated. After passing through the MZM, the subcarrier spacing is narrowed by half, in other words, the number of subcarriers is doubled (305). To achieve the subcarrier doubling with good uniformity among the subcarriers, appropriate driving voltage is required for the MZM (301). Here, the output of the pattern and clock generator (106) goes through another variable attenuator (302), which sets the input level to the MZM's modulator driver (303) powered by a DC source (304). The level of the variable attenuator (302) is also controlled by the variable rate transponder controller (201) through another output channel of the low speed DAC (203). The controller (201) calculates the appropriate level required for the target setting or checks the level using a look-up table, and in turn determines the appropriate attenuation level. It then outputs the digital format of the attenuation level to the low speed DAC (203), which sets the attenuator (302) to produce the appropriate power level at the driver (303) to control the modulator (301). Similar to before, variable attenuators (302) may be integrated with the DAC as one element. The other parts of the transmitter are the same as the initial configuration shown on FIG. 2.

Figure 4:
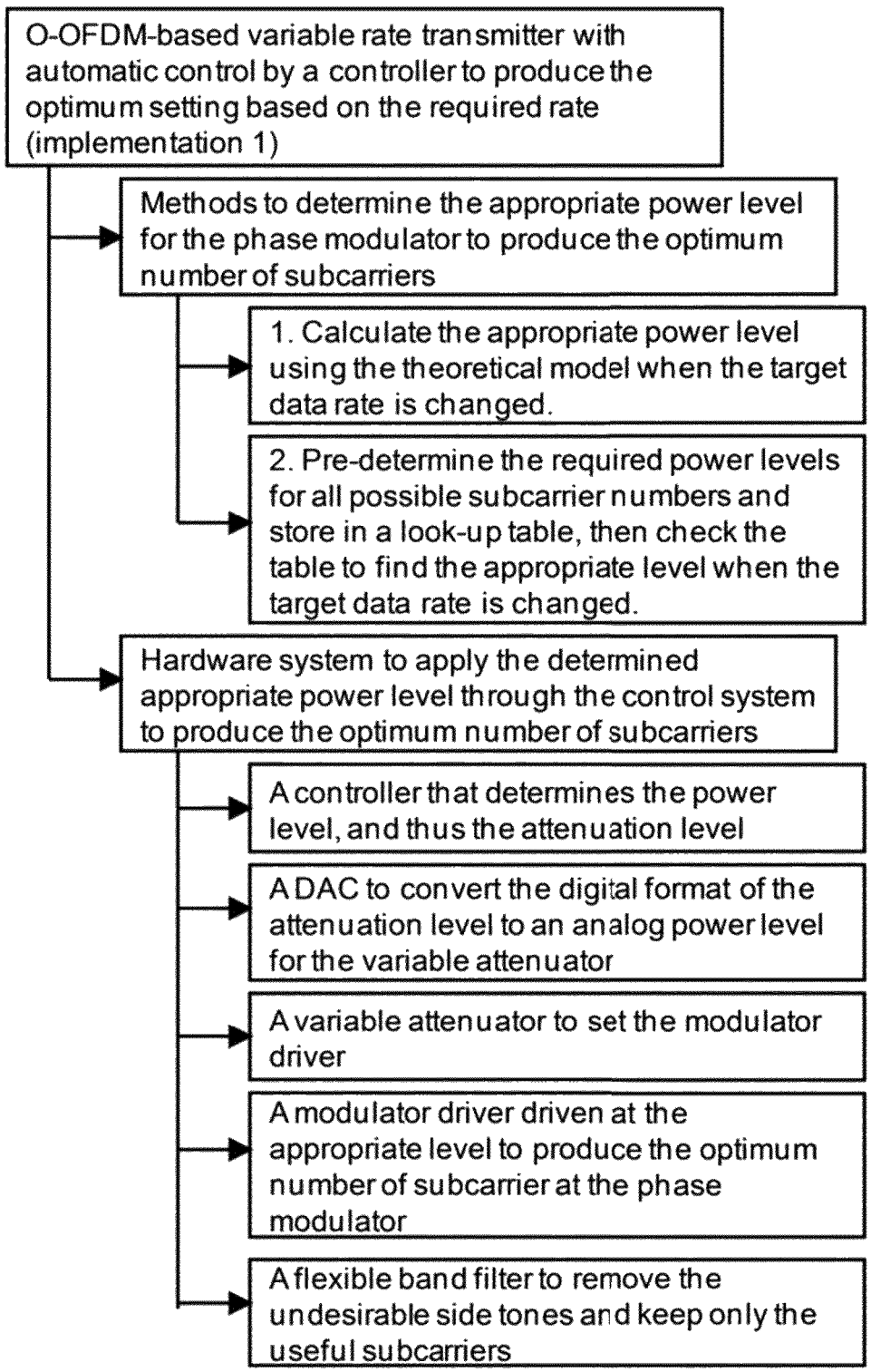
FIG. 4 shows the steps corresponding to the variable rate transmitter of FIG. 2.

Referring to the diagram of FIG. 4, there are shown key steps of the transmitter of FIG. 2, in accordance with the invention.

The optical-orthogonal frequency division multiplex O-OFDM based variable rate transmitter with automatic control by a controller to produce an optimum setting based on a required rate includes: determining an appropriate power level for a phase modulator to produce an optimum number of subcarriers; and applying the determined appropriate power level through a control system to produce an optimum number of subcarriers.

Determining an appropriate power level, noted above with respect to FIG. 4, includes: 1) calculating an appropriate power level using a theoretical model when a target data rate is changed, and 2) predetermining required power levels for all possible subcarrier numbers and storing them in a look-up table and then checking the table to find an appropriate power level when the target data rate is changed.

Figure 3:
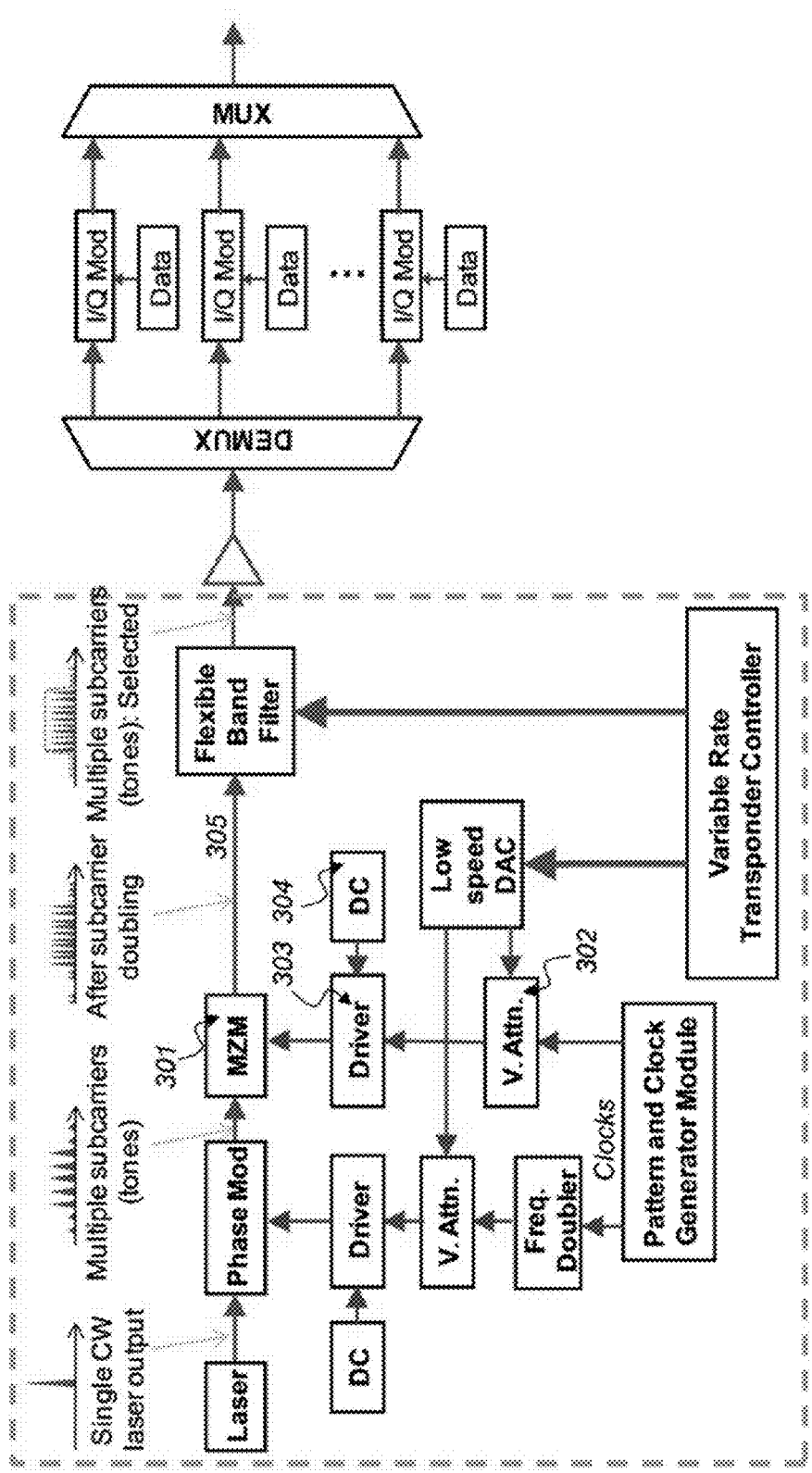
FIG. 3 shows a proposed expanded method to construct a variable rate transmitter using subcarrier adjustment on O-OFDM system.
Figure 5:
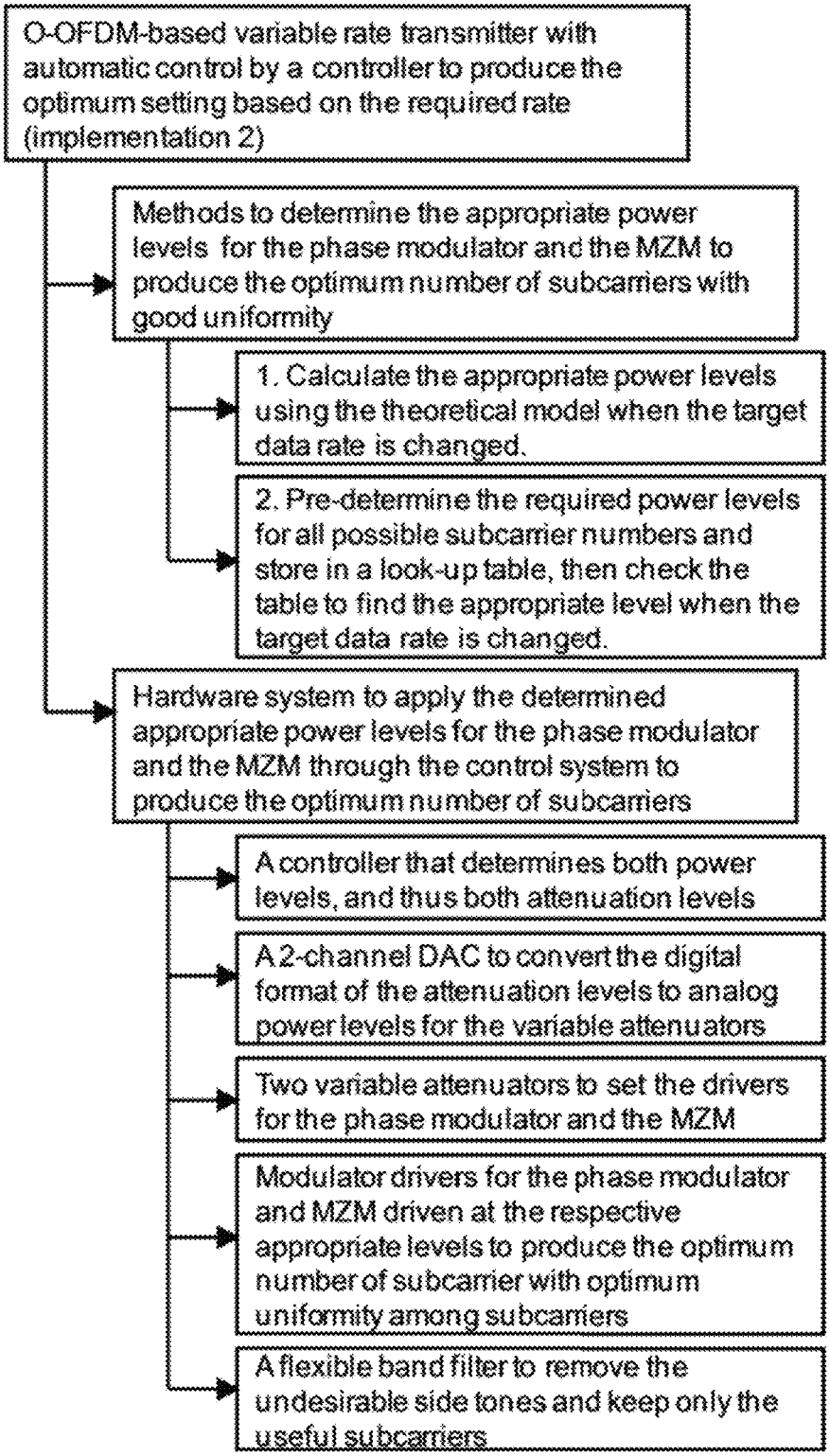
FIG. 5 shows the steps corresponding to the variable rate transmitter of FIG. 3.

Applying the determined appropriate power level includes: determining the power level, by a controller, thereby determining an attenuation level, converting a digital format of the attenuation level to an analog power level for a variable attenuator, employing the variable attenuator to set a modulator driver, driving the modulator driver at an appropriate level to produce an optimum number of subcarrier at the phase modulator, and removing undesirable side tones and keeping only useful subcarriers Referring to the diagram of FIG. 5, there are shown key steps of the alternative transmitter embodiment of FIG. 3, in accordance with the invention.

The optical-orthogonal frequency division multiplex O-OFDM based variable rate transmitter with automatic control by a controller to produce an optimum setting based on a required rate includes: determining appropriate power levels for a phase modulator and a Mach-Zender modulator MZM to produce an optimum number of subcarriers with predetermined uniformity; and applying the determined appropriate power levels for the phase modulator and the MZM through a control system to produce an optimum number of subcarriers.

Determining appropriate power levels, noted above with respect to FIG. 5, includes: 1) calculating appropriate power levels using a theoretical model when a target data rate is changed, and 2) predetermining required power levels for all possible subcarrier numbers and storing them in a look-up table and then checking the table to find an appropriate power level when the target data rate is changed.

Applying the determined appropriate power levels includes: determining the power levels for both the phase modulator and MZM, by a controller, thereby determining attenuation levels for both the phase modulator and MZM, converting by way of 2-channels a digital format of the attenuation levels of both the phase modulator and MZM to analog power level for respective variable attenuators, employing the two variable attenuators to set respective modulator drivers for the phase modulator and MZM, driving the respective modulators for the phase modulator and MZM at respective appropriate levels to produce an optimum number of subcarriers with optimum uniformity among subcarriers, and removing undesirable side tones and keeping only useful subcarriers.

From the foregoing it can be appreciated that the inventive method can achieve variable rate transmitter on O-OFDM (super-channel) optical WDM system with: better power utilization (not wasting optical power in unwanted subcarriers); better signal quality (higher OSNR at the transmitter end); longer transmission distance (as a result of transmitting better quality signal); better stability in the WDM system (through having better uniformity among subcarriers); fast and low cost (through automatic reconfiguration, no need manual operation, therefore is fast and reduce OPEX);

The inventive method can also be combined with the technique of changing the modulation data rate in each subcarrier, which is achieved electronically by changing the modulation format or changing the subcarrier data rate or both. This will bring up another level of flexibility in channel rate control. However there is a tradeoff in transmission distance variation.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. For example, those of ordinary skill in the art will recognize that multiple configurations for the optical processing path shown in FIG. 4 are possible to achieve the same signal transformation effect. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method comprising the steps of:
   determining an optimum number of subcarriers based on a target data rate;
   determining an appropriate power level for a phase modulator to cause the phase modulator to produce the optimum number of subcarriers, comprising:
      calculating the appropriate power level using a theoretical model when the target data rate is changed;
      determining required power levels for all possible subcarrier numbers and storing said power levels in a look-up table; and
      checking the table to find an appropriate power level when the target data rate is changed; and
   applying the determined appropriate power level via a controller to the phase modulator to produce said optimum number of subcarriers;
   wherein said optimum number of subcarriers enables an optical-orthogonal frequency division multiplex (O-OFDM) based variable rate transmitter with automatic control by a controller to produce an optimum setting based on the target data rate.

2. The method of claim 1, wherein said step of applying comprises determining the power level, by a controller, thereby determining an attenuation level.

3. The method of claim 2, wherein said step of applying comprises converting a digital format of the attenuation level to an analog power level for a variable attenuator.

4. The method of claim 3, wherein said step of applying comprises employing the variable attenuator to set a modulator driver.

5. The method of claim 4, wherein said step of applying comprises driving the modulator driver at an appropriate level to produce an optimum number of subcarriers at the phase modulator.

6. The method of claim 5, wherein said step of applying comprises removing undesirable side tones and keeping useful subcarriers.

7. The method of claim 1, wherein said power level comprises power levels determined for said phase modulator and a Mach-Zehnder modulator (MZM), to produce said optimum number of subcarriers.

8. The method of claim 7, wherein said determined appropriate power levels are applied to said phase modulator and said MZM.

9. The method of claim 8, wherein said step of applying comprises determining said power levels and thus attenuation levels for said phase modulator and said MZM.

10. The method of claim 9, wherein said step of applying comprises converting by way of 2-channels a digital format of the attenuation levels of both said phase modulator and said MZM to analog power level for respective variable attenuators.

11. The method of claim 10, wherein said step of applying comprises employing said two variable attenuators to set respective modulator drivers for said phase modulator and MZM.

12. The method of claim 11, wherein said step of applying comprises driving the respective modulators for said phase modulator and MZM at respective appropriate levels to produce an optimum number of subcarriers with optimum uniformity among subcarriers.

13. The method of claim 12, wherein said step of applying comprises removing undesirable side tones and keeping useful subcarriers.

* * * * *

UNITED STATES PATENT AND TRADEMARK OFFICE
CERTIFICATE OF CORRECTION

PATENT NO. : 8,873,952 B2
APPLICATION NO. : 13/588425
DATED : October 28, 2014
INVENTOR(S) : Philip Nan Ji, Yue-Kai Huang and Ting Wang Page 1 of 1

It is certified that error appears in the above-identified patent and that said Letters Patent is hereby corrected as shown below:

On the Title Page

Item (60) reads:
(60) Provisional application No. 61/530,069, filed Sep. 1, 2011.

Should read:
(60) Provisional application No. 61/530,068, filed Sep. 1, 2011.

Signed and Sealed this
Twenty-third Day of May, 2017

Michelle K. Lee
*Director of the United States Patent and Trademark Office*